United States Patent
Bezner et al.

[11] Patent Number: 5,724,937
[45] Date of Patent: Mar. 10, 1998

[54] INTERNAL COMBUSTION ENGINE WITH DIRECT FUEL INJECTION

[75] Inventors: Martin Bezner, Walheim; Günter Karl, Esslingen; Klaus Meier, Leutenbach; Helmut Schorn, Esslingen, all of Germany

[73] Assignee: Mercedes Benz AG, Stuttgart, Germany

[21] Appl. No.: 763,081

[22] Filed: Dec. 10, 1996

[30] Foreign Application Priority Data

Dec. 15, 1995 [DE] Germany ............ 195 46 945.3

[51] Int. Cl.$^6$ .................................. F02M 19/00
[52] U.S. Cl. .................................... 123/275
[58] Field of Search ..................... 123/275, 193.4, 123/276, 269, 261, 266, 268, 298, 286, 256, 299

[56] References Cited

U.S. PATENT DOCUMENTS

| | | | |
|---|---|---|---|
| 4,186,692 | 2/1980 | Kawamura et al. | 123/275 |
| 4,404,938 | 9/1983 | Nikolic | 123/256 |
| 4,414,940 | 11/1983 | Loyd | 123/299 |
| 4,446,831 | 5/1984 | Artman | 123/286 |
| 4,457,273 | 7/1984 | Andrews | 123/275 |
| 4,483,291 | 11/1984 | Artman | 123/286 |
| 4,620,516 | 11/1986 | Reim et al. | 123/275 |
| 5,305,720 | 4/1994 | Ando et al. | 123/193.4 |

FOREIGN PATENT DOCUMENTS

| | | | |
|---|---|---|---|
| 0 108 014 | 5/1984 | European Pat. Off. | 123/275 |
| 0 249 699 | 12/1987 | European Pat. Off. | 123/275 |
| 0 558 072 | 9/1993 | European Pat. Off. | 123/275 |
| 0 639 703 | 2/1995 | European Pat. Off. | 123/275 |
| 43024 642 | 1/1994 | Germany | 123/275 |

*Primary Examiner*—Raymond A. Nelli
*Attorney, Agent, or Firm*—Klaus J. Bach

[57] ABSTRACT

In an internal combustion engine with direct fuel injection having a piston disposed in a cylinder and a cylinder head which together define a combustion chamber, wherein a fuel injector is mounted in the cylinder head so as to inject fuel into the combustion chamber in a conical pattern whereby the fuel is mixed with combustion air to form a combustible mixture, the cylinder head has a shape around the conical fuel pattern which aids in providing combustible fuel/air mixture at least in an area adjacent the conical fuel pattern where a spark plug with electrodes is mounted such that its electrodes are disposed outside the conical fuel pattern.

11 Claims, 3 Drawing Sheets

INTERNAL COMBUSTION ENGINE WITH DIRECT FUEL INJECTION

BACKGROUND OF THE INVENTION

The invention relates to an internal combustion engine with direct fuel injection into the combustion chamber which is delineated by a piston disposed in a cylinder of the internal combustion engine and the interior wall of a cylinder head which includes an injector which injects fuel into the combustion chamber in a conical pattern whereby the fuel is mixed with air admitted to the combustion chamber through an intake valve to form a combustible fuel/air mixture which is ignited by the spark of a spark plug.

Such an internal combustion engine is described, for example in DE 43 24 642 A1, the fuel is injected by an injection nozzle in the wall of the cylinder head into the combustion chamber in a cone-shaped pattern and forms with the air admitted to the combustion chamber a combustible fuel/air mixture. The mixture is ignited by a spark plug which projects far into the combustion chamber and which has electrodes which are routinely wetted by the fuel. This however has the disadvantage that, in time, carbon deposits form on the electrodes which may suppress the development of a spark. Another disadvantage is that the electrodes become very hot where they are wetted by the fuel and thereby cause knocking of the engine.

EP 02 49 699 A1 discloses an internal combustion engine with direct fuel injection which includes a combustion chamber formed by a piston disposed in the cylinder of the internal combustion engine and the interior wall of a cylinder head. The interior wall of the cylinder head extends normal to the longitudinal axis of the cylinder and an injection nozzle is disposed on the longitudinal cylinder axis whereby fuel is injected into the combustion chamber in a cone-shaped pattern. Next to the injection nozzle, a spark plug projects from the interior wall of the cylinder head into the combustion chamber and has electrodes which reach closely to the superficies of the fuel cone generated by the injection nozzle. The piston bottom includes cavities receiving the electrodes of the spark plug in the top dead center position of the piston. As a result of the piston being moved upwardly and the smaller combustion chamber volume generated thereby, the fuel concentration is changed and a volume displacement toward the electrodes of the spark plug occurs so that the electrode is subjected to increased wetting by fuel which again results in carbon deposits on the electrodes.

It is the object of the present invention to provide an internal combustion engine with direct fuel injection in such a way that it can operate properly over a long period of time.

SUMMARY OF THE INVENTION

In an internal combustion engine with direct fuel injection having a piston disposed in a cylinder and a cylinder head which together define a combustion chamber, wherein a fuel injector is mounted in the cylinder head so as to inject fuel into the combustion chamber in a conical pattern whereby the fuel is mixed with combustion air to form a combustible mixture, the cylinder head has a shape around the conical fuel pattern which aids in providing combustible fuel/air mixture at least in an area adjacent the conical fuel pattern where a spark plug with electrodes is mounted such that its electrodes are disposed outside the conical fuel pattern.

With the arrangement according to the invention, the electrodes of the spark plug are not wetted by the fuel injected into the combustion chamber but in the space between the fuel cone and the electrodes a mixture vortex is generated during fuel injection which is ignited by the spark plug. The vortex is generated by turbulence of the fuel/air mixture and the mixture is carried into contact with the electrodes of the spark plug. The combustion flame expands from the vortex in the space adjacent the spark plug electrodes to all of the fuel/air mixture in the combustion chamber. A direct contact between the fuel cone and the electrodes is avoided however during the process. The superficies of the fuel cone is disposed at a distance from the interior wall of the cylinder head, at least in the area where the electrodes of the spark plug are located. In the intermediate space between the fuel cone and the wall of the cylinder head the vortex is ignited by the electrodes projecting into the intermediate space. Since the fuel cone remains at a distance from the electrodes of the spark plug the chances of carbon deposition and the knocking tendencies are greatly reduced. The intermediate space is a continuous air gap between the fuel cone and the cylinder head wall. Air containing fuel particles which is displaced by the fuel injected into the combustion chamber flows back into the intermediate space into the area around the spark plug. During this return flow of air along the combustion chamber wall additional fuel particles out of the fuel cone are carried along whereby a combustible fuel/air mixture is generated in the area of the spark plug electrodes. The formation of such an air gap is made possible in accordance with the invention by a conical shape of the interior wall of the combustion chamber which parallels about the superficies of the fuel cone. Another advantage of the arrangement according to the invention is that the electrodes can be relatively short since they are disposed at a distance from the fuel cone.

In one embodiment, there is an intermediate space provided adjacent the fuel injection nozzle between the fuel cone and the combustion chamber wall. The electrodes of the spark plug are disposed in this intermediate space in which a mixture vortex with a relatively high fuel content is generated whereby a rich fuel/air mixture is present at the spark plug even after termination of the fuel injection.

In an advantageous embodiment, the area of the combustion chamber which is disposed in the cylinder head includes a section with reduced cross-section onto which the fuel cone generated by the fuel injector impinges. The section of reduced cross-section represents an obstacle which aids in providing a mixture vortex in the annular intermediate space.

The spark plug electrodes are preferably disposed in a cavity formed in the interior wall of the cylinder head. The flow distribution in the combustion chamber is therefore not inhibited by any parts protruding into the combustion chamber.

Various embodiments of the invention will be described below on the basis of the accompanying drawings.

DESCRIPTION OF THE PREFERRED EMBODIMENTS

Figure 1:
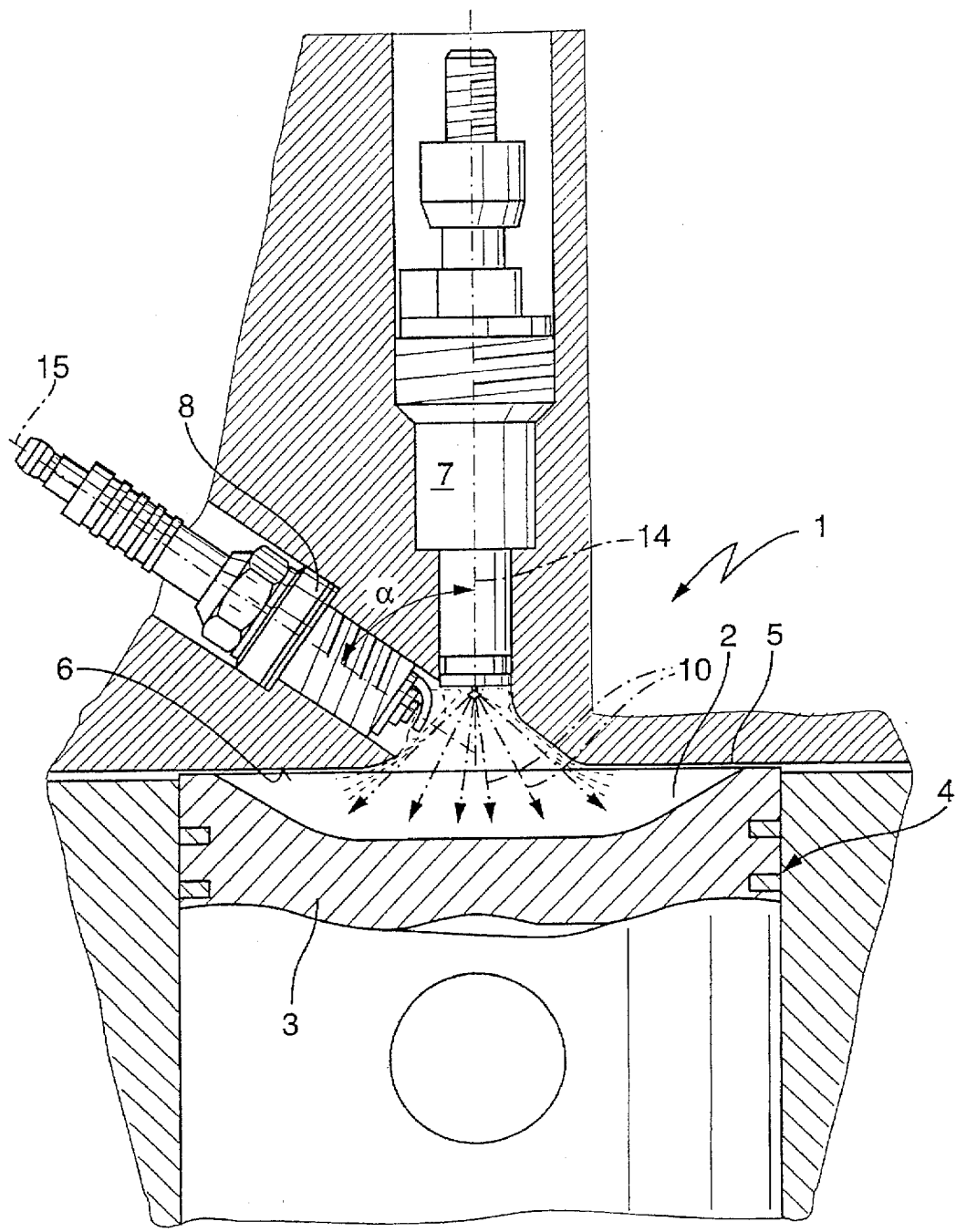
FIG. 1 is a cross-sectional view of a combustion chamber of an internal combustion engine.

The internal combustion engine 1 of which only the combustion chamber is shown in the figures includes a piston 3 which delineates a combustion chamber 2 formed in the cylinder 4 of the internal combustion engine between the piston 3 and a cylinder head 5. Mounted into a bore in the cylinder head 5 is an injector 7 through which fuel is injected into the combustion chamber 2. The fuel injected into the combustion chamber 2 is mixed therein with combustion air which is admitted through an inlet valve and forms with the combustion air a combustible fuel/air mixture. The fuel/air mixture is ignited by a spark plug 8 which has electrodes 9a, 9b between which a spark is generated.

The injector 7 is arranged co-axially with the piston 3. Fuel injected by the injector 7 is distributed through the combustion chamber 2 in a cone-like pattern, starting at the injection point 17 at the front end of the injector 7 adjacent the combustion chamber 2 and forming a fuel cone 10. In order to insure proper operation of the internal combustion engine over a long period, the electrodes 9a, 9b of the spark plug 8 are arranged at a distance from the superficies 11 of the fuel cone 10. The electrodes of the spark plug 8 which include the center electrode 9a and the mass electrode 9b are so arranged that the mass electrode 9b is disposed at a small distance from the superficies 11 of the fuel cone 10. With this arrangement, two fluid flow effects occur: First, a mixture vortex 16 develops between the superficies 11 of the fuel cone 10 and the combustion chamber wall 6 in the area adjacent the injector 7. The mixture vortex is formed by combustion air which removes from the fuel cone with which it is in close contact fuel particles which mix with the combustion air. The mixture vortex 16 provides for a combustible fuel/air mixture which develops in the area adjacent the injector 7 in a 360° angle area around the injection point 17. In the combustion chamber wall 6 of the cylinder head 5, there is a cavity 13 into which the electrodes 9a, 9b of the spark plug 8 extend and which is also filled by the mixture vortex 16. A spark generated between the electrodes 9a, 9b ignites the mixture vortex 16 whereupon the combustion flame spreads over the whole combustion chamber 2.

Figure 2:
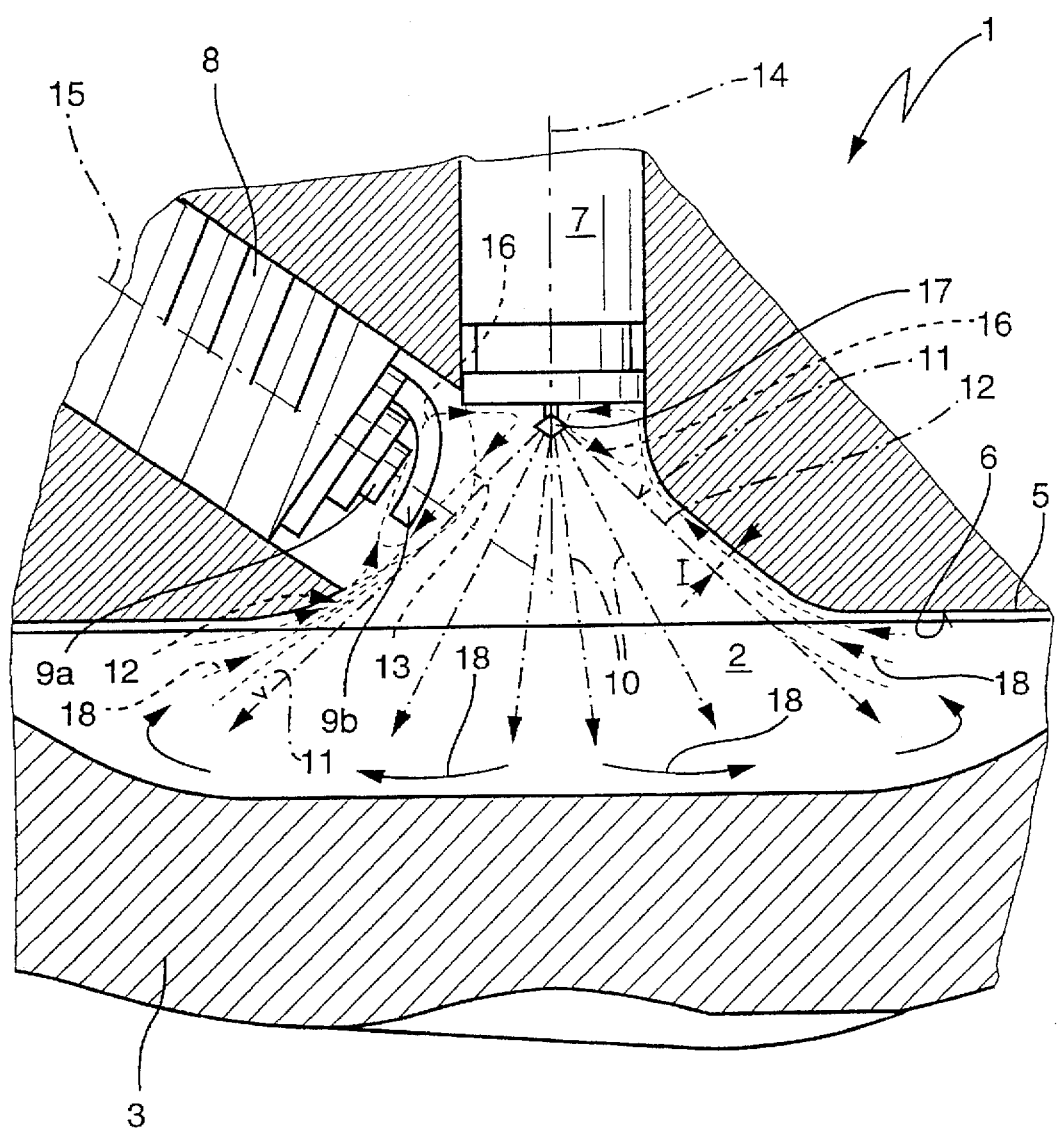
FIG. 2 is an enlarged view of a part of FIG. 1.

A second fluid flow effect is provided by the fact that the superficies 11 of the fuel cone is disposed at a distance from the interior wall 6 of the cylinder head so that a continuous gap 12 is formed between the superficies 11 and the interior wall 6: the fuel injected into the combustion chamber 2 pushes the air from the combustion chamber area adjacent the piston radially outwardly as indicated by the arrows 18 (FIG. 2) so that the air subsequently flows into the air gap 12 between the superficies 11 of the fuel cone 19 and the combustion chamber wall 6 of the cylinder head 5. The flow direction of the air in the gap 12 is then in opposition to the travel direction of the fuel injected into the combustion chamber. Subsequently, the air flowing into the air gap 12 mixes with the mixture vortex 16 and, consequently, reaches the area of the spark plug electrodes 9a, 9b. The air gap between the fuel cone and the combustion chamber wall has a width I as shown in FIG. 2.

In order to support the formation of the air gap the combustion chamber wall 6 within the cylinder head 5 is also cone-shaped so that the fuel cone 10 and the combustion chamber wall 6 extend parallel in the area of the air gap 12. The fuel is injected into the combustion chamber 2 in such a way that the superficies of the fuel cone remains parallel to the combustion chamber wall over the whole area.

The longitudinal axes of the injector 7 and, respectively, of the spark plug 8 enclose an angle of about 60°, the longitudinal axis 15 of the spark plug being disposed at an angle of 90° with respect to the superficies 11 of the fuel cone 10, or respectively at an angle very close to a right angle.

Figure 3:
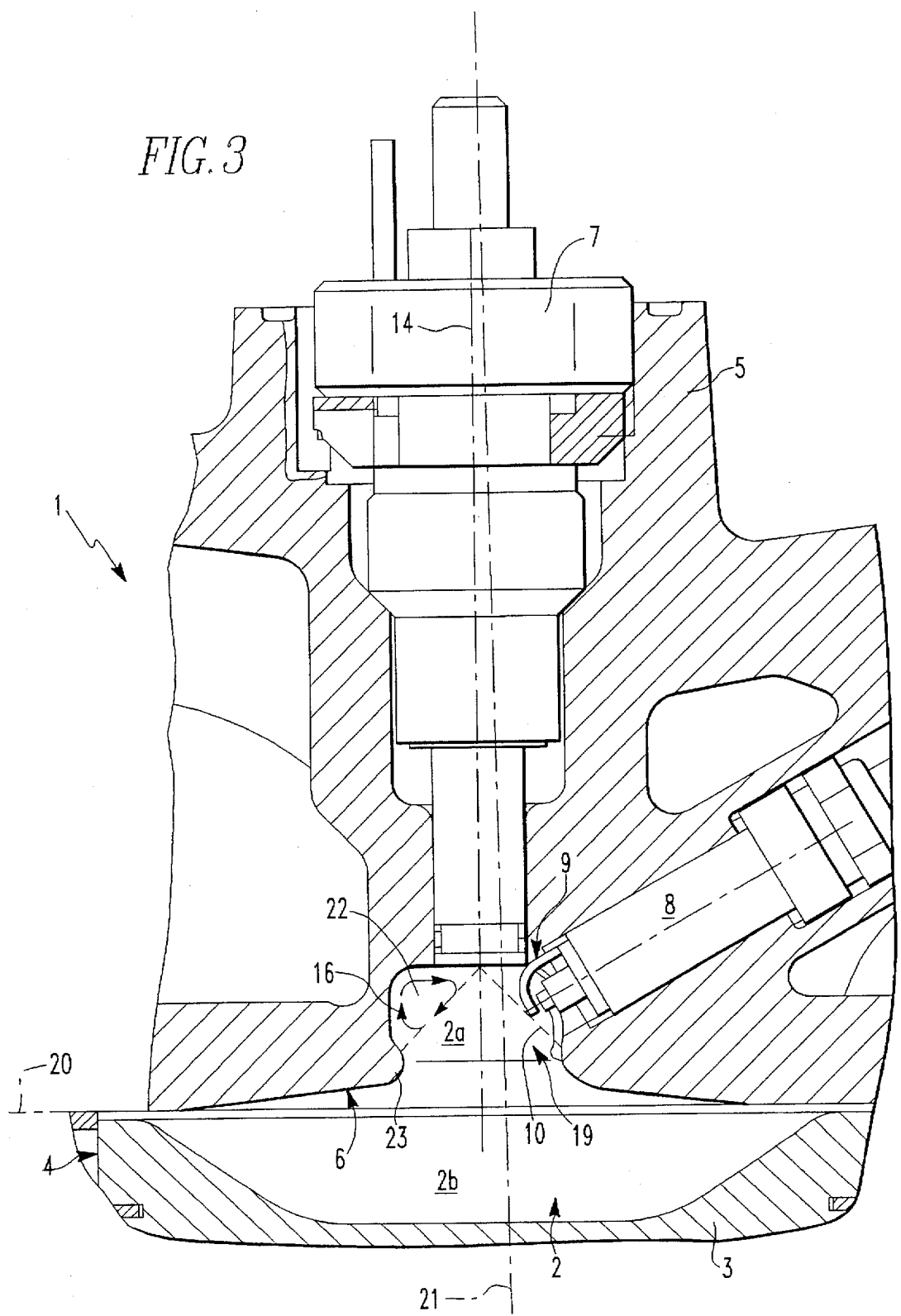
FIG. 3 is a cross-sectional view of a combustion chamber with a somewhat modified arrangement.

FIG. 3 shows another embodiment of the invention. The cylinder 4 of the internal combustion engine 1 includes a piston 3 which, together with the cylinder head 5, delineates the combustion chamber 2. The injector 7 is mounted into the cylinder head 5 such that its longitudinal axis 14 is displaced radially from the longitudinal axis 21 of the piston 3. The injector 7 generates a fuel cone 10 which expands downwardly toward the piston 3 in a cone-like fashion. The fuel/air mixture in the combustion chamber 2 is ignited by a spark which is generated between the electrodes 9 of spark plug 8 which extends into the combustion chamber and is mounted at an inclined position.

A separation plane 20 between the cylinder head 5 and the engine casing with the cylinder 4 divides the combustion chamber 2 into two areas 2a, 2b. The area 2a which is disposed in the cylinder head 5 includes a part 19 of reduced cross-section onto which the fuel cone 10 generated by the injector impinges. In this way, the development of the mixture vortex 16 is encouraged which is established in the combustion chamber part 2a in the space 22 between the fuel cone 10 and the inner wall 6 of the combustion chamber adjacent the injector 7. The electrode 9 of the spark plug 8 extends into this space 22 which surrounds the fuel cone 10 but are still disposed at a distance from the fuel cone 10. The spark of the spark plug ignites the mixture vortex 16 which develops in the annular space 22.

The part 19 of the combustion chamber area 2a disposed in the cylinder head 5 is formed by an annular wall projection 23 formed on the combustion chamber wall 6 in the cylinder head 5. The wall projection 23 projecting into the combustion chamber reduces the cross-section of the part 19 and forms an obstacle which supports the formation and the return flow of the mixture vortex 16. The fuel cone impinges onto the combustion chamber wall 6 about in the area of the wall projection 23 whereby part of the fuel is reflected into the space 22 where it contributes to the formation of the mixture vortex 16. As a result, the fuel remains in the area 2a of the combustion chamber adjacent the spark plug 8 over an extended period so that a combustible rich fuel/air mixture remains adjacent the spark plug after completion of the fuel injection.

The invention is intended for use in connection with gasoline engines. But it is also possible to use the arrangement in connection with Diesel engines wherein a glow plug would be provided in place of the spark plug.

What is claimed is:

1. An internal combustion engine with direct fuel injection having a piston disposed in a cylinder of the engine and a cylinder head with an internal wall which together delineate a combustion chamber, an injector mounted in said cylinder head so as to inject fuel into said combustion chamber in a cone-like pattern whereby the fuel is mixed with combustion air admitted to the combustion chamber to form a combustible mixture, and a spark plug with electrodes mounted in said conical cylinder head portion in such a way that said electrodes are disposed outside the superficies of said cone-like fuel injection pattern, said internal cylinder head wall having a conical portion around said cone-like fuel injection pattern which, at least in the area of said spark plug, extends at a distance from said conical cylinder head wall portion and has a superficies which is essentially parallel to said conical cylinder head wall portion so as to provide for a gap between the fuel cone superficies and the conical cylinder head wall portion.

2. An internal combustion engine according to claim 1, wherein the electrodes of said spark plug are disposed in a recess formed in said conical cylinder head portion.

3. An internal combustion engine according to claim 1, wherein said injector is arranged coaxially with said piston.

4. An internal combustion engine according to claim 1, wherein the axis of said injector and the axis of said spark plug define an angle of about 60°.

5. An internal combustion engine with direct fuel injection having a piston disposed in a cylinder of the engine and a cylinder head with an internal wall which together delineate a combustion chamber, an injector mounted in said cylinder head so as to inject fuel into said combustion chamber in a cone-like pattern, whereby the fuel is mixed with combustion air admitted to said combustion chamber to form a combustible mixture, and a spark plug with electrodes mounted in said cylinder head in such a way that said electrodes are disposed outside a superficies of said cone-like fuel pattern, said combustion chamber having in the area adjacent said injector an annular space formed between said fuel cone pattern and said combustion chamber wall into which the electrodes of said spark plug extend.

6. An internal combustion engine with direct fuel injection according to claim 5, wherein the area of said combustion chamber adjacent said injector includes an annular wall projection providing for an area with reduced cross-section.

7. An internal combustion engine with direct fuel injection according to claim 6, wherein said annular projection is provided in said cylinder head above a separation plane between the cylinder head and the top end of said cylinder.

8. An internal combustion engine with direct fuel injection according to claim 6, wherein said annular projection extends so far into the combustion chamber that the fuel of said conical fuel pattern impinges at least partially onto said projection.

9. An internal combustion engine according to claim 5, wherein the electrodes of said spark plug are disposed in a recess formed in said conical cylinder head portion.

10. An internal combustion engine according to claim 5, wherein said injector is arranged coaxially with said piston.

11. An internal combustion engine according to claim 5, wherein the axis of said injector and the axis of said spark plug define therebetween an angle of about 60°.

* * * * *